United States Patent [19]

Crose et al.

[11] 4,025,660
[45] May 24, 1977

[54] METHOD OF MASKING, VENTING AND COATING THE INSIDE OF A RECEPTACLE

[75] Inventors: James R. Crose, Chelmsford; Charles A. Hartnett, Beverly, both of Mass.

[73] Assignee: W. R. Grace & Co., Cambridge, Mass.

[22] Filed: Sept. 20, 1976

[21] Appl. No.: 724,822

Related U.S. Application Data

[62] Division of Ser. No. 651,163, Jan. 21, 1976, Pat. No. 3,995,586.

[52] U.S. Cl. .............................. 427/28; 118/622; 239/15; 427/181; 427/236
[51] Int. Cl.² ........................................... B05D 1/06
[58] Field of Search ............... 118/622, 629–635, 118/308, 310, 311, 317, 318, 326; 239/3, 15; 427/28, 27, 29, 180, 181, 183, 231–234, 236, 421, 424–427

[56] References Cited

UNITED STATES PATENTS

| | | | |
|---|---|---|---|
| 1,883,960 | 10/1932 | Koppel et al. ................. 251/331 X |
| 2,611,438 | 9/1956 | Hanline et al. ................. 251/191 X |
| 2,616,164 | 11/1956 | Tiedemann ..................... 251/331 X |
| 2,775,952 | 1/1957 | Schur ............................. 118/325 X |
| 2,868,163 | 1/1958 | Boyd .............................. 118/317 |
| 2,907,357 | 10/1959 | Sandhage et al. ................. 141/59 |
| 3,033,235 | 5/1962 | Thaning ......................... 251/331 X |
| 3,081,947 | 3/1963 | Walter ........................... 118/317 x |
| 3,095,905 | 7/1963 | Glauber ......................... 251/331 X |
| 3,121,593 | 2/1964 | McIlvaine ...................... 222/195 X |
| 3,138,482 | 6/1964 | Gehl .............................. 118/24 X |
| 3,248,606 | 4/1966 | Fraser ............................... 317/3 |
| 3,446,642 | 5/1969 | Webb ............................. 427/185 |
| 3,468,339 | 9/1969 | Gray ............................. 251/191 X |
| 3,540,653 | 11/1970 | Fabre ............................... 239/15 |
| 3,546,017 | 12/1970 | Pendleton et al. ................. 427/32 |
| 3,580,299 | 5/1971 | Alkalay et al. ...................... 141/59 |
| 3,659,151 | 4/1972 | Fabre ............................... 317/3 |
| 3,687,176 | 8/1972 | Fernandes et al. ................. 141/59 |
| 3,746,300 | 7/1973 | Welker .......................... 254/191 X |
| 3,768,514 | 10/1973 | Goto ............................ 251/191 X |
| 3,850,208 | 11/1974 | Hamilton ............................ 141/59 |
| 3,850,659 | 11/1974 | Barnes ............................. 427/33 |
| 3,884,277 | 5/1975 | Rademacher et al. ............. 141/59 |
| 3,901,184 | 8/1975 | Payne et al. ................... 239/124 X |
| 3,904,930 | 9/1975 | Waldron et al. ................ 427/28 X |
| 3,922,213 | 11/1975 | Smith et al. ....................... 204/181 |

OTHER PUBLICATIONS

SME Technical Paper FC 73–521 (1973), "Electogasdynamic Powder Coating Tunnel" Meredith C. Gourdine, Gourdine Systems, Inc.

*Primary Examiner*—Morris Kaplan
*Attorney, Agent, or Firm*—Edward J. Hanson, Jr.; C. E. Parker

[57] ABSTRACT

In a method for coating the inside of a receptacle, fluid flow is controlled by a valve that has a torpedo shaped valving member in the middle of an enlarged passageway. The valving member contains an elastomeric sleeve that expands outwardly from a hinged area when compressed to form a line seal with the passageway. The valve is in the form of a multiple valve — feeding, bypass and venting valving units all in one dielectric casting. Said casting is unitary with flange means operative to seal and mask said inside with respect to the external surface of the receptacle while the vent and coating material discharge means is functionally associated with said inside.

3 Claims, 3 Drawing Figures

METHOD OF MASKING, VENTING AND COATING THE INSIDE OF A RECEPTACLE

This is a division, of application Ser. No. 651,163 filed Jan. 21, 1976, now U.S. Pat. No. 3,995,586.

SUMMARY OF THE INVENTION

The invention relates to a method of coating the inside of a receptacle including valving electrostatic powders entrained in gas.

By an aspect of the invention in one preferred form a valve is provided that has a passageway defined by walls with a valving unit in it. The valving unit has a reciprocating member reciprocating between a valve opening and a valve closing position, a relatively stationary member and an elatomeric sleeve. The elastomeric sleeve is attached at one end to the reciprocating member and at its other end to the stationary member. The elastomeric sleeve has a hinged area and is dimensioned such that upon valve closing reciprocation of the reciprocating member the elastomeric sleeve flexes, expanding outwardly to engage the walls of the passageway closing off the passageway. In a preferred form there are such passageways and valving units in the valve and they are enclosed and mechanically joined together in a single casting of dielectric material. In a preferred form two of the passageways are only intermittently connectable by the placing of a hollow object over adjacent respective openings to them. The third passageway is a bypass passageway connected to the first passageway upstream of where the elastomeric sleeve engages the walls of the first passageway.

By another aspect of the invention a method of valving a fluid is provided. The method includes flexing an elongated sleeve on its linear axis and forcing a lateral expansion of the sleeve to fill a passageway to close the valve and releasing the compression of the elongated sleeve on its linear axis and relieving the lateral expansion of the sleeve to open the passageway and open the valve.

By another aspect of the invention a valve diaphragm is provided. The valve diaphragm is an annular elastomeric sleeve that has an annular hinged area at which the sleeve will fold when compressed. The sleeve expands radially outwardly at the fold upon compression. The sleeve is preferably substantially cylindrical and open at one end and tapered at its opposite end. The annular hinged area is in the substantially cylindrical end adjacent to the juncture of the cylindrical end and the tapered end.

PREFERRED EMBODIMENT

Figure 1:
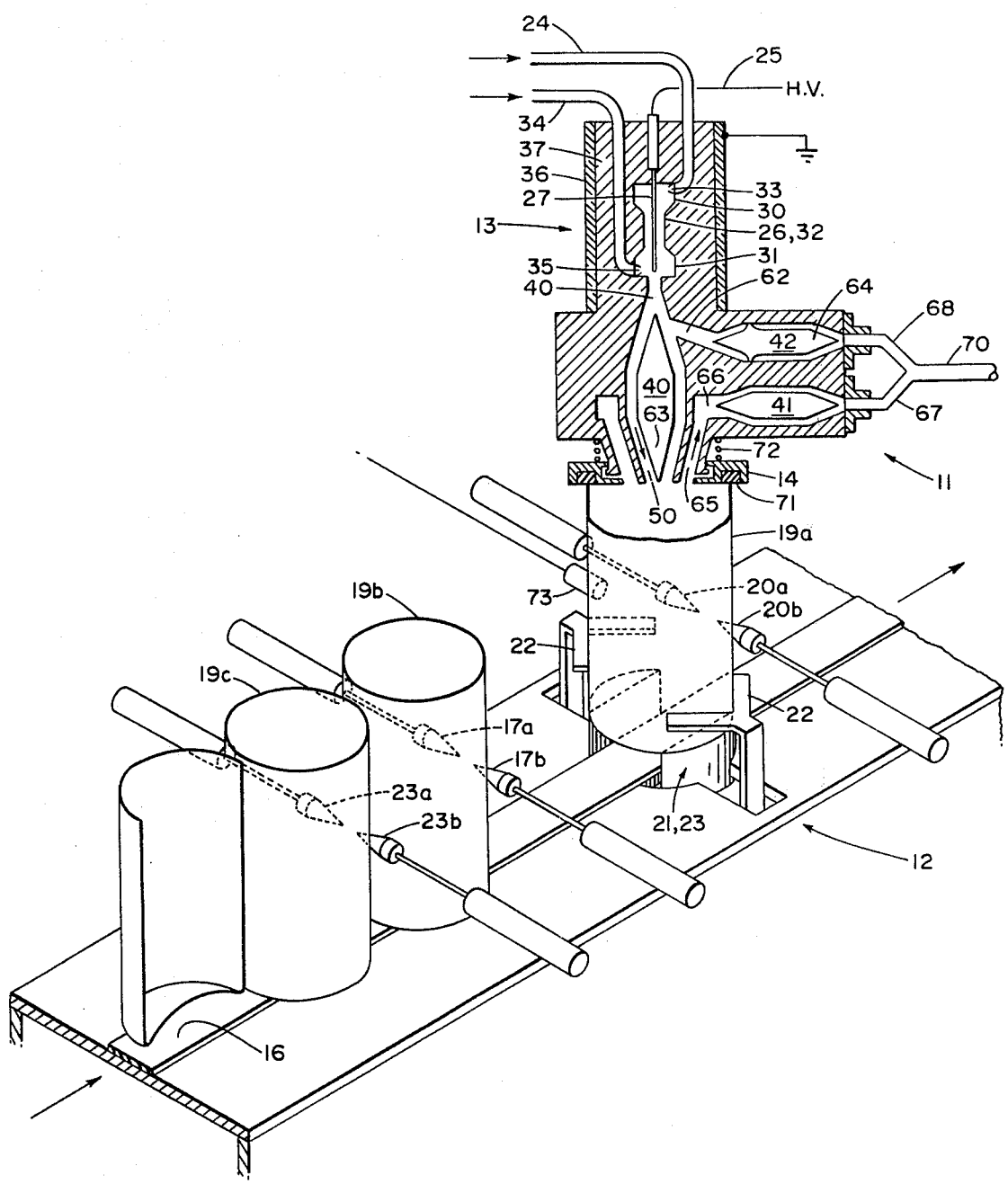
FIG. 1 is a perspective view of the electrostatic coating apparatus.

Referring to FIG. 1 of the drawings, a multiple valve 11 which is associated with an electrostatic coating device 12 is shown. The device or apparatus 12 in its basic components includes a powder charging device 13, the multiple valve or multiple valve assembly 11 and a can masking head 14 for sealing the can during application of the powder. The overall powder coating apparatus and its method of operation are further described in an application Ser. No. 651,162, filed Jan. 21, 1976 and assigned to the same assignee.

Cans 19a, b and c which are to be coated with charged powder passing through the valve 11 are conveyed to a powder coating station or position 15 by conveying means 16 which operates continuously. The cans are intermittently fed into the powder coating station 15 by operation of gate means 17a and 17b. The gate means engage a can from both sides retracting on signal to allow the conveyor to move the can to the powder coating station 23. The can is stopped in the powder coating station by gate means 20a and 20b. Split lifting chuck 21 straddles the conveyor 16 and lifts the can toward the masking head 14. Centering fingers 22 assure that the can is centered with the head 14. To assist in orderly feeding, gate means 23a and 23b stop the line of infed cans ahead of gate means 17a and 17b. After release from the powder coating station the cans are delivered by the conveyor 16 to an oven (not shown) for firing or to a collecting station for transfer in batches to the oven. The firing fuses the powder to form an integral unitary coating.

Air or gas entrained powder is supplied under pressure via supply line 24 to the electrical charging device 13. The charging device 13 has a high-voltage supply lire 25, a charging cavity 26 and an electrode 27. Cavity 26 has end bells 30 and 31 which are separated by a throat 32. Powder transmission line 24 communicates with end bell 30 through port 33. The electrode 27 passes through the charging cavity 26 on the cavity's longitudinal axis. A balancing air supply line 34 communicates with end bell 31 through port 35. The charging device 13 is enclosed within a grounding shell 36 which is filled with a cast dielectric insulating medium 37.

Figure 2:
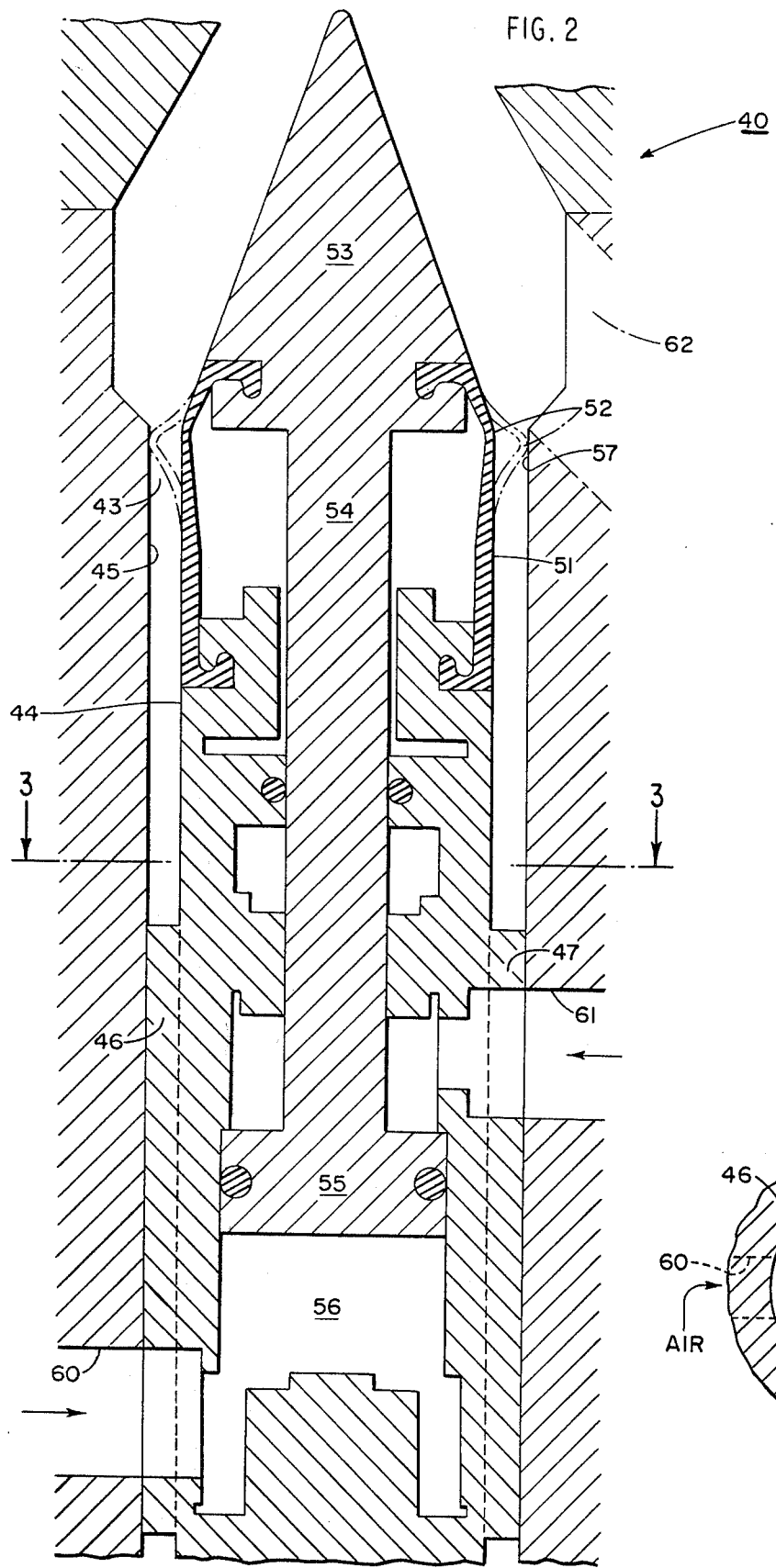
FIG. 2 is a vertical section view of the supply valve unit.
Figure 3:
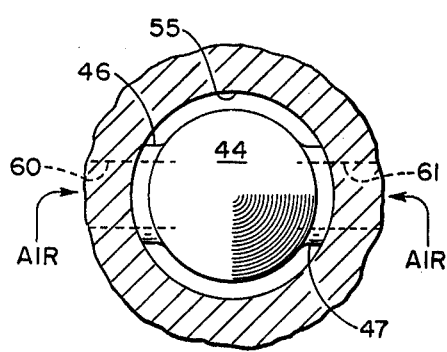
FIG. 3 is a horizontal cross-sectional view taken along the line 3—3 of FIG. 2.

The exit 40 communicates with the multiple valve assembly 11. The multiple valve 11 includes three valve units: supply valve unit 40, vent valve unit 41 and bypass valve unit 42. Referring next in particular to FIGS. 2 and 3, the supply valve unit 40 may be seen to include an enlarged passageway 43 which includes a torpedo shaped housing 44 which is centered with respect to cylindrical wall 45 of the passageway 43. By torpedo shaped housing it is meant an elongated body with relatively cone shaped outer ends. Preferably the cones are elongated and the outer exposed surfaces of the housing are substantially evenly spaced from a central axis extending through the body of the housing to the outer apexes of the cones.

The housing 44 is connected via two struts, 46 and 47, to the cylindrical wall 45. The housing 44 is placed medially and axially within the enlarged passageway 43 and is sized, with the struts 46 and 47 included, so that the cross sectional flow area of the passageway remains substantially constant with the unobstructed passageway 40. The passageway 43 is shaped aerodynamically to minimize powder-air entrainment and turbulance. There is a clean smooth core shaped flow transition both in the enlargement of the passageway from the dimension of the unobstructed passageway 40 and the diminution of the passageway to the outlet port 50 (FIG. 1).

The valving unit 40 further includes a sealing element or diaphragm 51 mounted at one end of the housing 44. The diaphragm 51 is a deflectable elastomeric sleeve provided with a hinged area 52 that is tailored and thinned to achieve the flextured expansion of the diaphragm diameter at the desired region. It may be seen that the diaphragm 51 has a substantially cylindrical open end and a tapered opposite end. The tapered end is a frustoconical cone with an opening in its outer end through which the nose cone 53 penetrates or passes. The diaphragm 51 is secured at its outer end by the clamping engagement of the nose cone 53 and at its base by being clamped within the body of the housing 44. The diaphragm is aligned with the walls of the housing 44 when the valve 40 is open so as to provide the smooth cone shaped flow transition at the enlargement end of the housing and valve passageway. The nose cone 53 is connected to the stem 54 of a piston 55 which reciprocates within an air cylinder 56 to close the diaphragm 51 against the outer cylindrical wall 45 at the seat region 57 of the enlarged supply line 43. An air valve (not shown) switches the air between air inlets 60 and 61 to reciprocate the piston and thereby opening and closing the passageway 43 to powder/air flow.

The diaphragm 51 is preferably composed of an elastomeric material and more preferably silicon rubber. The material resists erosion from the powder, seals over particulate material which is always present because of the air entrained powder carried through the valve. The cross-sectional dimension of the diaphragm provides adequate sealing pressure, resistance to deformation by the pressurized air in the passage 40, the long cycle life and produces no obstruction to flow during the diaphragms relaxed or open state. The diaphragm provides a line seal with its outward deflection against the wall 45.

Referring to FIG. 1 as well as FIG. 2, the multiple valve assembly 11 has port 62 exiting from enlarged passageways 43 just upstream of the annular seat region 57. Port 62 communicates with the bypass valve unit 42 which has the same construction as the supply valve unit 40 with the exception that the tail cone 63 of the supply valve unit may be blunted or elongated compared to the tail cone 64 of the bypass valve unit 42. The tail cone 63 is configured to fit the nozzle requirements for dispensing the powder into a can of given shape and size. Tail cone 64 is proportioned to give the smoothest possible flow transition on the exhaust side of the enlarged passageway.

The vent valve unit 41 is identical to the valve unit 42 and vents the air from the can 19a. The air passes from the can 19a through the annular vent passageway 65 entering the valve unit 41 through the port 66. The exit ports from the valves 41 and 42 are so sized that the flow capacitance through both branches of the multiple valve 11 will be equalized. Port 67 exits the bypass valve 41. Port 68 exits the bypass valve 42. The ports 67 and 68 feed into a common manifold 70 which may feed to an additional valve assembly identical to valve asembly 11, if two valve assemblies are to be used in tandem or to a filter means which would collect any unused powder for recycle or other disposition.

Several features of the apparatus have not yet been mentioned. The masking head 14 has a gasket 71 that sealingly engages the rim of the can at the can's open end. The head 14 lifts against spring 72 to assure a positive seal. Signaling device 73 is interlocked with the controls of the multiple valve 11 and prevents the valve 42 from closing and valves 40 and 41 from being open when a can is not in the loading station.

Turning now to the operation of the invention in one preferred form thereof. Power is supplied to the apparatus 12 including the high voltage line 25. Conveyor 16 advances the cans toward the loading station 21 activating the sensor 73 which brings about the supplying of air to the powder charging device 13 through line 34 and the supplying of air entrained powder through supply line 24. The air and entrained powder forms a vortex circulation in the chamber 30 of the charging device progressing from its point of entry to the throat 32. The incoming air in the airline 34 forms an opposite vortex circulation in the chamber 31 of the charging device 13 progressing from its point of entry to the throat 32. When the two vortexes engage they begin oscillating in the throat causing a pulsing discharge of the entrained powder from the charging device 13 and through the exit 40 and into the multiple valve 11.

The air and entrained powder passes into the upstream end of passageway 43 where it is shunted back and forth between feed valve 40 and bypass valve 42 by the cycling of the apparatus 12. The sequencing is with any of the well known electromechanical programable components which cycle continuously as set so long as sensor 73 continues to signal that a can is in position when it is time to open valves 40 and 41 and close valve 42.

The cans are released by gate means 23a and 23b to gate means 17a and b which operates in timed sequence with gate means 23a and b. The cans are then released in time sequence and moved by the conveyor 16 to gate means 20a and b where sensor 73 is activated, then chuck 23 lifts the can with the fingers 22 centering the can in timed sequence into engagement with gasket 71. Thereafter the multiple valve sequences to open valve 40 and close valve 42. Vent valve 41 is timed to open with valve 40.

There is then a time delay set for a particular can size and type so that the powder and air passing through the supply valve 40 and the outlet port or nozzle 50 into the can 19a can displace the air within the can 19a out vent 65 until the approximate circumstance wherein the powder entrained air has filled the can 19a and reached vent 65. At this time the vent valve 41 and the supply valve 40 close and the bypass valve 42 opens. It will be understood that at this time the can is part of an enclosed suspension in communication with the valve 40 downstream of the valve seat 57 (FIG. 2) and with the valve 41 upstream of the valve seat of that valve. The kinetic energy of the entrained powder is substantially dissipated when the air's passage is stopped. This seems to substantially eliminate the influence the velocity of the powder had on entering the can and the eddy currents in the air's movements. This is particularly important in coating difficult areas in a can uniformly. This allows the initial charge on the powder to drive the powder to the sides of the can. The can which is at a lower voltage potential accepts the powder driven outwardly to the sides of the can by the space charge formed by like charged particles. The can need not be grounded.

After the timed period set for a particular can, the chuck 23 and the fingers 22 reverse their motion to return the can 19a to the conveyor 16. The gate means 20a and b open and the can 19a is conveyed to either a collection station or to a subsequent treatment station such as into an oven (not shown) for fusing the powder. The second can 19b is released by the gate 17a and b as the gate 20a and b release can 19a. After can 19a has had time to clear gate 20a and b gate 20a and b closes to hold can 19b and the sequence previously described respecting the raising and positioning of can 19a and the powder coating and release thereof is repeated. The second can 19b was released by gate 23a and b to gate 17a and b at the time the chuck 23 began to raise the can 19a. When the last can on the conveyor 16 clears sensor 73, valve 40 remains closed and bypass valve 42 remains open until the entrained powder has cleared the valve 11 at which time the valve can be shut off in this condition. The bypass valve 42 is always open when the valve 40 is closed.

SPECIAL FEATURES AND LIMITATIONS

The multiple valve lends itself to superior performance with particulate materials conveyed in a gas stream that might build up in many types of valves. The valve also is superior in its ability to be cast of dielectric material with all of the enlarged passageways enclosed in a single casting of material to electrically insulate them and mechanically connect them together. Thus the valve provides a line closure that does not trap particles and superior electrical properties for handling electrically charged materials. Of course, broadly the valve could be used for handling gases other than air as well as liquids and aerosols.

The valves 40 and 41 and the valve 42 open and close in balance so that the flow of the air and air entrained powder is not made unnecessarily turbulent. In other words this means the same volume of air and entrained powder passes through port 40 at all times; a pertinacious constant flow is maintained through the multiple valve 11.

A sufficiently short cycle time should be selected to prevent powder from escaping out the vent 41. One of the important features of the system is the fact that it is a self-contained system and no powder is sprayed into the surrounding ambient except during a malfunction. Suction stations may be provided adjacent to the masking head 14 to compensate for misalignment of a can.

In a desirable and preferred embodiment a second multiple valve 11 is connected in series so that the bypass valve and the vent valve feed through line 70 into the second valve port 40. The second multiple valve operates in the same manner as the multiple valve just described. Cans are fed to the second valve in the same manner already described for the first multiple valve. The two valves would be alternated so that no powder would need to be lost through the second valve through the valves' bypass. Thus only the air exhausted from the can would be vented through the vent valve during cycling of the equipment. In any preferred embodiment where the valve 11 is used to convey powder there would usually be a collector and filter at the exit from the last multiple valve to collect any escaping powder and preferably such powder would be recycled. Of course, in proper circumstances other component parts can be substituted for the ones described in detail in the presently preferred embodiment. Furthermore the sequencing of the device may be varied advantageously in proper circumstances. For example it may be desirable in some uses of the device when coating cans to slightly delay the closing of the vent valve 41 after the closing of valve 40 to properly vent the can.

It has been discovered surprisingly that very small particles give the best coating results. This is particularly true with heat fusable epoxy based powders and the most preferred epoxy phenolic powder. The preferred particles size is 2–30 microns, more preferably 5–20 microns and most preferably 7–12 microns. These are the average micron readings on a powder. For example, in a particular preferred powder the Coulter counter analysis showed a distribution of particle sizes in a powder having an average particle size of 5.2 with a distribution of 3–20 microns with the bulk of the powder being 3–8 microns.

As used in the present application, particles can be solid matter, drops of liquid or solid matter and liquid. By kinetic velocity it is meant the movement of particles by the air's flow or by the inertia of its own movement.

The means for positioning the cans to receive the powder are shown only for purposes of illustration and are not in and of themselves a part of the present invention. Any means for supplying charged electrostatic particles under sufficient pressure to drive them through the valve may be used. Also any means may be used for sequencing the valve, electrical, mechanical or electromechanical, etc.

EXAMPLE

It has been determined in actual test operations that the device described as preferred, using an epoxy phenolic powder, PCL 403 which has an average particle size of about 12 microns, obtainable from the Dewey & Almy Chemical Division of W. R. Grace & Co., gave a thorough even coating of 350 milligrams of powder to a 12 oz. steel beverage can having a deep draw well around the rim as shown in FIG. 1. During the operation the air and air-powder to the charging device were balanced in their infeed pressures at approximately 45 psi at ports 33 and 35. It was observed during operation of valve 11 that the electrical charge on the powder was maintained, there was no powder leakage and no powder build up in the passages of the valve. Further there was no significant wear or deterioration in the valve. In addition the air feed was very uniform as was the flow cut off. This was shown by the thorough coating of the narrow moat, which may be seen in the sectional can in FIG. 1 extending around the bottom of the can. This moat offers only a small clearance with the can's outside wall, and was thoroughly coated on all sides on its bottom surface and upper edges where the velocity of any gases or moving powders would cause eddy currents preventing even coating.

The line seal flattens out slightly due to the pressure of the elastomer against the passageway wall. However, the seal is essentially a line seal. If the valve is to be used with such pressures that the elastomer of the diaphragm 51 cannot by itself sustain the pressure and valve the fluid then gas pressure may be provided in the air space behind the diaphragm (see FIG. 2) to balance the outside pressure exerted by the fluid being valved. Of course the number of struts 46 and 47 may be varied under proper circumstances to one or three or some other number and the air lines 60 and 61 could be passed through the same strut.

While in accordance with the patent statues, what is considered to be the referred embodiment of the invention has been described, it will be obvious to those skilled in the art that numerous changes and modifications may be made therein without departing from the invention and it is therefore aimed in the appended claims to cover all such equivalent variations as fall within the true spirit and scope of the invention.

We claim:

1. A method of coating the inside of a receptacle comprising:

conveying and positioning an open receptacle in functional relationship to a masking and sealing dispenser head of unitary construction;

contacting said head and receptacle whereby said opening is sealed and masked with respect to the external receptacle surface and the dispenser is functionally associated with the inside of said receptacle;

venting said receptacle through a valved vent passageway communicating with the dispenser discharge conduit;

operating a discharge valve in said conduit;

operating a bypass valve in a bypass conduit located upstream of said discharge and vent valves;

establishing a coating material flow to the intake of said head;

selectively operating said valves whereby said bypass valve is closed when the discharge and vent valves are open to vent and charge said receptacle and whereby the vent and discharge valves are closed when the bypass valve is open to maintain said material flow;

establishing flow patterns of said material flow by designing said valves with conical nose portions; and at least one said valve operation occurring by establishing a pressure force to annularly and laterally flex a closed sleeve element at an intermediate portion thereof, which sleeve is fixed at one end and attached at the other end to a movable one of said conical nose portions whereby to either close or open the associated valve passageway.

2. A method of coating as in claim 1 where said movable conical nose is the head of a piston element which axially engages said sleeve to effect said flexing and said force is a fluid pressure.

3. A method of coating as in claim 2 wherein said flexing occurs at an annularly thinned portion of said sleeve.

* * * * *